United States Patent [19]

Drees et al.

[11] 4,140,837

[45] Feb. 20, 1979

[54] DECORATIVE ARTICLE HAVING A BONDABLE SURFACE AND METHOD OF MANUFACTURE

[75] Inventors: Terry P. Drees, Cincinnati, Ohio; Michael C. Gallagher, Fort Mitchell, Ky.

[73] Assignee: Formica Corporation, Cincinnati, Ohio

[21] Appl. No.: 844,557

[22] Filed: Oct. 25, 1977

[51] Int. Cl.² .................. B32B 29/06; B32B 27/42
[52] U.S. Cl. .................. 428/503; 428/187; 428/409; 428/531
[58] Field of Search ............... 428/530, 531, 529, 503, 428/187, 409

[56] References Cited

U.S. PATENT DOCUMENTS

| | | | |
|---|---|---|---|
| 2,732,325 | 1/1956 | Lindenfelser et al. | 428/503 X |
| 3,067,077 | 12/1962 | Latella et al. | 428/503 X |
| 3,345,248 | 10/1967 | Pounds et al. | 428/503 |
| 3,701,706 | 10/1972 | Giddings et al. | 428/503 X |
| 3,841,956 | 10/1974 | Palazzolo et al. | 428/503 X |
| 3,846,217 | 11/1974 | Grosheim | 428/503 X |
| 3,887,743 | 6/1975 | Lane | 428/503 X |
| 3,949,133 | 4/1976 | Santurri et al. | 428/531 X |
| 4,076,896 | 2/1978 | Bunkowski | 428/530 |
| 4,083,744 | 4/1978 | Degens | 428/530 X |

*Primary Examiner*—Harold Ansher
*Attorney, Agent, or Firm*—Frank M. Van Riet

[57] ABSTRACT

A decorative article of manufacture having at least one face which can be glued to other surfaces by using common adhesives and may be painted with a variety of paints and stains is disclosed.

5 Claims, No Drawings

DECORATIVE ARTICLE HAVING A BONDABLE SURFACE AND METHOD OF MANUFACTURE

BACKGROUND OF THE INVENTION

The use of decorative laminates in furniture and kitchen cabinetry has grown steadily for many years. Modified melamine resins have sufficient flow at low pressures when impregnated into cellulose paper sheets to be bonded directly to wood particleboard, cured and discharged from the press while still hot. Such products have been in commercial use in Europe for many years and are now being introduced in large volume in many other parts of the world. Sometimes called low pressure laminates, they are more descriptively called decorative faced boards. Decorative faced boards are engineered to provide prefinished decorative vertical surfacing components for the kitchen cabinet, furniture, fixture and mobile home industries.

A typical board may consist of a 65 lb. (3,000 sq. ft./ream) print or decorative sheet impregnated with about 60% to 65% melamine/formaldehyde resin which is bonded to a particleboard (from ⅜" to ¾" in thickness) at a pressure of about 250–400 psi in 40 to 90 seconds at about 325°–450° F. Both sides of the particleboard must be covered to prevent warpage and one or both particleboard faces may carry a decorative sheet. The warpage preventing layer opposite the primary decorative surface is called a balance sheet. Some constructions will carry a resin impregnated translucent overlay above the decorative sheet in order to impart a harder surface to the decorative faced board. Subsequent to the pressing of the large size board, it will be cut into smaller panels for shipment to ultimate users. Some users will perform additional operations on a panel such as drilling holes, inserting cutouts for hardware or edgebanding the panel with matching laminate strips.

The surfaces of these decorative boards are hard and non-absorbent and, therefore, are not suitable for subsequent gluing to other structural members or to other decorative boards because the resulting bond is poor. The strength of the bond may be improved by sanding or otherwise roughening the surfaces to be united, but there are a number of disadvantages to such a treatment. For example, sanding is wasteful and is apt to introduce variations in thickness of the glue layer and a non-uniform bond strength throughout the board. Moreover, the decorative surface may be damaged by the sanding process. Furthermore, by sanding one side of a decorative board, stresses may be created which may cause the board to warp.

Furthermore, in many service applications, the consumer may desire to paint the interior surface of a board which has been formed into a useful article e.g. a kitchen cabinet. For the same reasons as described above with regard to the gluing problems associated with these boards, painting the boards is also a problem because of poor adhesion.

SUMMARY

We have overcome the above-mentioned disadvantages and also provided a simplified process of manufacture in which a decorative board suitable for gluing to other surfaces is obtained without the necessity for subsequent surface treatment. The invention is directed to decorative faced boards having a more uniform and efficient bondable surface than those having a surface which is mechanically roughened. Furthermore, the gluable surface also provides an excellent paintable surface.

There is provided herein a process for the preparation of a decorative board, one or both surfaces of which are suitable for gluing to the surface of another board or to other bondable surfaces which process comprises, interposing between the thermoset resin impregnated balance sheet and the pressing plate surface, a single sheet of paper which has not been impregnated with the thermoset resin.

DESCRIPTION OF THE INVENTION INCLUDING PREFERRED EMBODIMENTS

As mentioned above, the novel articles of the present invention possess a porous surface layer for painting and gluing opposite the primary decorative surface while retaining warp resistance.

The novel heat and pressure consolidated articles comprise, in superimposed relationship, A. a melamine/formaldehyde resin impregnated, decorative, cellulose paper sheet, B. a self-supporting particleboard substrate, C. a cellulose paper sheet having a basis weight of from about 40 lbs. to about 100 lbs., a Gurley porosity of from about 2 to about 35, a pH from about 6.0 to about 7.5, a volatile content before consolidation and impregnation, of from about 3% to about 7% and a wet strength of at least about 1.8 lb./in. width, impregnated with from about 50% to about 60% of a melamine/formaldehyde resin having a viscosity of from about 40 to about 120 cps. and a specific gravity of from about 1.2 to about 1.3, and D. a second cellulosic paper sheet having a basis weight of from about 15 lbs. to about 30 lbs., a Gurley porosity of from about 1 to about 10 and an α-cellulose content of about 100%

While not wishing to be bound to any particular theory as to why the instant decorative boards function as they do, it is believed that the gluable surface simulates the condition which is achieved when conventional decorative boards are sanded. Microscopic examination of a sanded surface shows that it contains a multitude of fiber-like appendages. Some of these appendages appear to be actual paper fibers which are lifted up from the paper surface by the sandpaper particles while others appear to be very fine ribbons of resin impregnated paper cut by the sandpaper. They resembled wood shavings achieved when cutting lumber with a hand plane or coated metal strips achieved when machining ductile metals.

It appears that the presence of these appendages is extremely important to the integrity of the adhesive joints made on the finished article when such a board is bonded to a different surface or to a second board surface. Where no such appendages exist, such as on the conventional, unsanded board surface, a smooth surface exists and when the interface of this surface and the adhesive is placed under stress, delamination occurs.

The properties of the thermosetting resin in sheet (C) and the properties of the raw paper of sheet (D) are such that a partial impregnation of the unimpregnated paper (D) occurs by passage of resin from the contiguous sheet (C), thereby leaving the outermost surface of the resultant article with a myriad of essentially raw and partially raw fiber appendages.

The novel articles of this invention can be glued to themselves, wood, high pressure laminate etc. with polyvinyl acetate, contact cement, urea, phenol. resorcinol or hot melt adhesives. Furthermore, the gluable surface (D) may be painted with latex, acrylic, enamel, urethane paints, oil and water based stains and the like.

Thermosetting impregnating resins which are useful for the decorative sheet (A) and layer (C) include melamine/formaldehyde resins, urea/formaldehyde resins, epoxies, polyesters and the like. Phenolic resins may also be used for impregnating layer (C). Melamine/formaldehyde resins modified with a catalyst and having sufficient flow at low pressures to be bonded directly to wood particleboard, cured and discharged from the press while still hot are preferred. The same resin may be used for both layers (A) and (C) of the board; however, as mentioned above, the resin must have a viscosity of from about 40 to about 120 centipoises, and a specific gravity of from about 1.2 to about 1.3 to be useful for impregnating paper layer (C).

The decorative papers from which layer (A) may be prepared are preferably produced from bleached wood pulp which is high, at least about 60%, in α-cellulose content. The paper is usually pigmented in a known manner to obtain the desired levels of color and opacity. They should have a basis weight per 3,000 square foot ream of at least about 40 pounds. It is preferred that the decorative paper have a controlled pH of that of the melamine/formaldehyde resin with which it is impregnated due to the influence pH has on the reaction rate of the resin after it is applied to the decorative paper.

The paper from which layer (C) is formed can be the same as that from which layer (A) is formed or it can be different. However, because the specific resin which is applied thereto must function as mentioned above before the unique results of the instant articles can be achieved, the properties of the paper of layer (C) must be more closely controlled. To that end, the paper for layer (C) must have a basis weight per 3,000 square foot ream of from about 40 pounds to about 100 pounds, preferably from about 50 pounds to about 75 pounds. The Gurley porosity 120 seconds maximum per 400 c.c. (1 ply) with a 1.0 square inch orifice, (TAPPI 460-OS-68), must range from about 2 to about 35, preferably from about 3 to about 25, and the pH must range from about 6.0 to about 7.5. The wet strength of the layer (C) paper must be at least about 1.8 pounds per inch of width. If an α-cellulose paper is used as layer (C), the α-cellulose content must be at least about 70%, by weight, based on the total weight of the sheet. Kraft paper, having properties conforming to the above limitations, can, however, also be used. The volatile content of the paper, before heat and pressure consolidation into the novel laminates hereof, must range from about 3% to about 7%, by weight, based on the total weight of the paper. The melamine/formaldehyde or other resin content of the paper layer (C) must range from about 50% to about 60%, by weight, based on the total weight of the paper.

Before impregnation, the decorative paper used to form either of both of layers (A) and (C) may be printed with a variety of pattern effects such as a woodgrain, marble, and other geometric configuration, or the decorative paper may be used without further embellishment as a solid color.

Impregnation of the papers used in layers (A) and/or (C) and drying of the resultant impregnated papers may be effected by conventional treaters and driers, at e.g., 80°–125° C. for 3–5 minutes. Treaters which have been found to be particularly useful in this regard achieve a high resin pick-up and uniform surface coating with sufficient surface resin. The impregnated paper of layer (A) generally contains at least about 40% resin, by weight, based on the weight of the impregnated paper.

Core material, i.e., self-supporting substrates useful in producing the decorative boards of the instant invention include medium density, mat-formed wood particleboard and medium density wood fiberboard. Useful core material, however, merely must enable the production of full-sized, smooth-faced, well bonded, crack and craze resistant panels.

The paper sheet which is used to form layer (D) of the novel articles of the instant invention must be formed from paper having an α-cellulose content of about 100%, by weight, based on the weight of the paper. The basis weight per 3,000 square foot ream must range from about 15 to about 30 pounds and the paper must have a Gurley porosity, as defined above, of from about 1 to about 10, preferably from about 2 to about 4. The result of the use of paper layers (C) and (D), as described above, is that layer (D) will possess a perfect gluable and paintable outer surface.

Typical release sheets may be applied to the decorative layer face of the board to prevent the press plate from sticking thereto during heat and pressure consolidation, as is known in the art. The outer side of layer (D), however, may be pressed directly against the press plate.

Various finishes may be applied to the decorative panels of the present invention. For example, the surface may be rendered glossy by using a highly polished press plate, matte by interposing a texturing release sheet between the press plate and the decorative sheet or embossed by using an etched press plate.

In order that the concept of the present invention may be more fully understood, the following examples are set forth. These examples are set forth primarily for the purpose of illustration and any specific enumeration of detail contained therein should not be interpreted as a limitation on the case except as indicated in the appended claims.

EXAMPLE 1

LAYER (A)

A pigmented, absorbent, 60 lb. basis weight (3,000 ft.$^2$ ream) decorative paper, having a honey teak woodgrain pattern is passed through a resin impregnating bath containing a catalyzed melamine/formaldehyde resin solution. Surplus resin is removed, so that the weight of the resin impregnated paper, after drying in a conventional manner by hot air amounts to about 60%, and volatile content of 5.5%.

LAYER (C)

A white, pigmented, absorbent 50 lb. basis weight paper is passed through the same resin bath as above except that the weight of the resin impregnated paper after drying amounts to 53% and a volatile content of 4.5%. The viscosity of the resin is 65 cps and the specific gravity is 1.24. The paper porosity is 25 sec. (Gurley). The pH is 6.5, the wet strenth is 2.5 and the α-cellulose content is 80%.

CONSOLIDATION

A 4' × 8' × ⅝" thick particleboard, weighing 45 lbs. per cubic foot, with sanded surfaces is sandwiched between 4' × 8' sheets of layers (A) and (C), above. The woodgrain pattern of the decorative sheet (A) is faced away from the particleboard, with the non-decorative surface in adjoint contact with the particleboard. Layer (C) is placed on the opposite face of the particleboard. On top of layer (C) is placed a 4' × 8' sheet of absorbent, non-pigmented, unimpregnated 100% alpha cellulose paper with a basis weight of 20 lbs. and a porosity (Gurley) of 2 sec. The resultant sandwich is placed between a pair of highly polished stainless steel press plates having a release coating thereon and is pressed at 160° C for 75 seconds under a pressure of 350 psi. The resultant decorative face panel has an attractive, aesthetically pleasing wood pattern on one side and a white surface on the opposite face. The white surface has a myriad of raw fiber appendages protruding from the surface thereof.

The panel is cut into a series of test specimens which are tested for their glueability, all glues being applied to the white surface, layer (D).

Testing of Glue Bond Strength

All glue bonds are tested by determining the amount of force per square inch the bond can withstand before either the glue bond fails or the particleboard core fails (approx. 100 psi). Two inch by two inch specimens are glued together, allowed to dry properly and then tested using a Baldwin tester. Samples are glued together according to the following specifications.

Polyvinyl Acetate

Polyvinyl Acetate is applied to one of the specimens in a uniform, thin layer. The two specimens are placed together immediately, and clamped for 24 hours. For testing of specimens to wood, two 2" × 2" specimens are glued to opposing edges of a 2" × 2" × ⅝" section of particleboard, thus, making the effective glue bond test area only 1½ in.² rather 4 in.² as with the normal construction.

Contact Cement

Contact cement is sprayed onto both specimens in a uniform, thin coating. The adhesive is allowed to air dry for 5–30 minutes. The specimens are placed together and roller pressure is applied. The specimens are allowed to dry for 7 days, before testing glue bond strength.

Phenol-Resorcinol

Phenol-Resorcinol is applied to both specimens in a uniform, thin coating. The adhesive is allowed to air dry for approximately 5 minutes. The specimens are placed together and clamped for 24 hours, before testing glue bond strength.

Urea Based Adhesive

Urea based adhesive is applied in a thin, uniform coat to one of the specimens. The specimens are placed together, immediately, and clamped for 24 hours, before testing glue bond strength.

Hot And Melt Adhesive

The National Strach Instaweld 34-3109 hot melt adhesive is heated to its softening point (200° C) and applied in the liquid state to one of the specimens. The two specimens are placed together very quickly and hand pressure is applied for 1 or 2 minutes until the thermosetting adhesive has cooled sufficiently. The samples are allowed to set for 24 hours, before testing of glue bond strength.

The results are set forth in Table I, below.

TABLE I

| Construction | Polyvinyl Acetate | Contact Cement | Urea Based Adhesive | Phenol Resorcinol | Hot Melt |
|---|---|---|---|---|---|
| Unsanded Panel to Unsanded Panel | Fair | — | Poor | Very Poor | Excellent |
| Layer (D) to Layer (D) | Excellent | — | Excellent | Excellent | Excellent |
| Sanded Panel to Sanded Panel | Excellent | — | Excellent | Excellent | Excellent |
| Unsanded Panel to High Pressure Laminate | Fair | Poor | — | — | — |
| Layer (D) to High Pressure Laminate | Excellent | Good | Excellent | Excellent | Excellent |
| Sanded panel to High Pressure Laminate | — | Fair | — | — | — |
| Layer (D) to Wood | Excellent | — | — | — | — |
| Unsanded Panel to Wood | Excellent | — | — | — | — |

Excellent = glue line stronger than internal strength of particleboard
Good = glue line approximates internal strength of particleboard
Fair = strength of particleboard greater than glue line strength
Very Poor; Poor = glue line bonding destroyed by mild hand distortion A second series of specimens is used to test the paintability of layer (D), the white surface of the panel produced in Example 1. The results are set forth in Table II, below.

The paintability testing is conducted as follows as set forth in the Paint Testing Manual, ASTM Special Technical Publication 500; June, 1972; Pg. 327; 5.3.6.4 Adhesive Tape Tests.

A cross about ½ by 1 inch in scribed in the paint coating. Scotch cellophane tape is applied to the cut and to a distance of about 3 inches beyond. The tape is rubbed with an eraser to firm adherence. The tape is pulled off with a sharp pull as nearly as possible to the plane of the surface. The result is rated numerically as follows:

(1) Peeling beyond scribe and tape
(2) Peeling beyond scribe under tape
(3) Peeling within scribe lines, 100%
(4) Peeling within scribe lines 50%
(5) Peeling within scribe lines 25%
(6) Peeling within scribe lines 10%
(7) Jagged peeling along scribe to ¼"
(8) Smooth peeling along scribe to ⅛"
(9) Trace of peeling
(10) No peeling On this scale, a score of either 9 or 10 is acceptable.

TABLE II

| Type of Paint or Stain | Unsanded Panel | Layer (D) |
|---|---|---|
| Latex | 9 | 10 |
| Acrylic | 9 | 10 |
| Enamel | 2 | 10 |
| Urethane | 2 | 10 |
| Oil based Stain | 2 | 10 |
| Water based Stain | 1 | 10 |

We claim:

1. A heat and pressure consolidated article consisting essentially of, in superimposed relationship,
   A. a melamine/formaldehyde resin impregnated decorative cellulose paper sheet,
   B. a self-supporting substrate,
   C. a cellulosic paper sheet having a basis weight of from about 40 lb. to about 100 lb. per 3000 square foot ream, a Gurley porosity of from about 2 to about 35, a pH of from about 6.0 to about 7.5, a volatile content, before impregnation and consolidation, of from about 3% to about 7% and a wet strength of at least about 1.8 lb./in. width, impregnated with from about 50% to about 60% of melamine/formaldehyde resin having a viscosity of from about 40 to about 120 cps., and a specific gravity of from about 1.2 to about 1.3, and
   D. a second, originally unimpregnated, cellulosic, paper sheet having a basis weight of from about 15 lb. to about 30 lb. per 3000 square foot ream, a Gurley porosity of from about 1 to about 10 and an $\alpha$-cellulosic content of about 100%, the exposed surface of which is characterized by a myriad of essentially raw and partially raw unimpregnated fiber appendages.

2. An article according to claim 1 wherein said sheet (C) comprises Kraft paper.

3. An article according to claim 1 wherein said sheet (C) has an $\alpha$-cellulose content of at least about 70%.

4. An article according to claim 1 wherein said sheet (C) is pigmented.

5. An article according to claim 1 wherein said sheet (D) is pigmented.